3,497,427
PROCESS FOR THE PRODUCTION OF
SULFURYL FLUORIDE
Shunji Nagase, Hajime Baba, and Takashi Abe, Nagoya,
Japan, assignors to Agency of Industrial Science & Technology, Tokyo, Japan
Filed Mar. 26, 1968, Ser. No. 716,065
Claims priority, application Japan, July 29, 1967,
42/48,719
Int. Cl. B01k 1/00
U.S. Cl. 204—59                               2 Claims

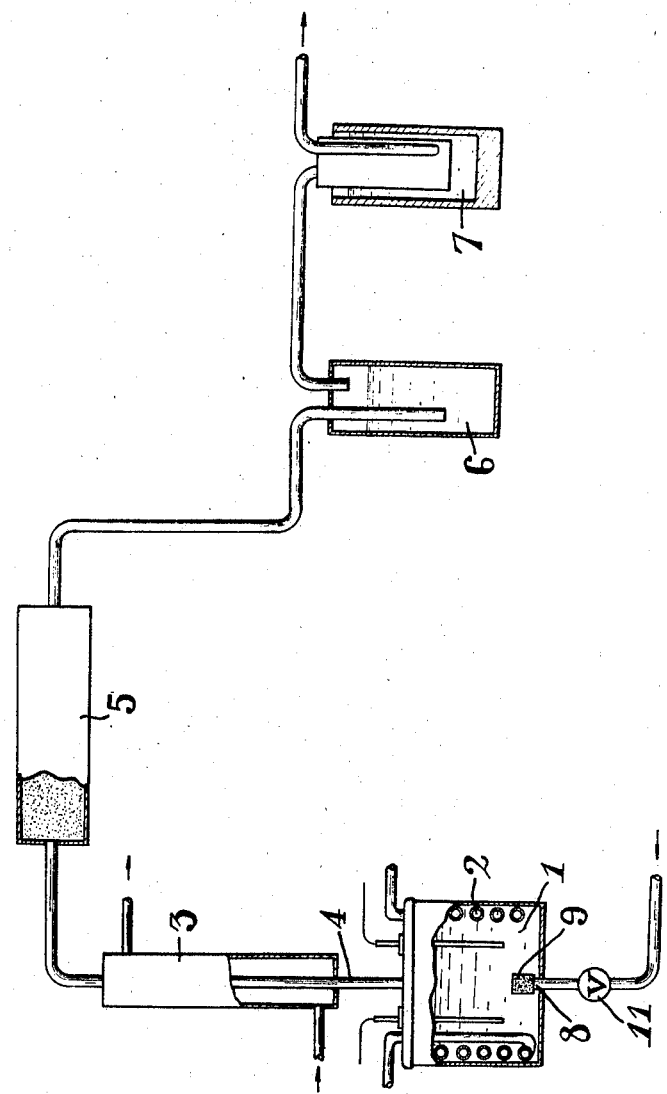

ABSTRACT OF THE DISCLOSURE

A process of producing sulfuryl fluoride by blowing a gaseous sulfur dioxide in fine foam condition into an electric current-applied anhydrous hydrogen fluoride thereby electrochemically fluorinating said gaseous sulfur dioxide.

BACKGROUND OF THE INVENTION

This invention relates to a process for the production of sulfuryl fluoride. More particularly, this invention relates to a process of producing sulfuryl fluoride by continuously blowing a gaseous sulfur dioxide in fine foam condition into an electric current-applied anhydrous hydrogen fluoride.

Heretofore, as the process for production of sulfuryl fluoride, a process of fluorinating sulfur dioxide with fluorine gas, argentic fluoride, nitrosyl fluoride or a mixture of chlorine and hydrogen fluoride has been known, but this type of process is defective in that it uses an expensive fluorinating agent and is complicated in operation. In addition, some require high temperature and catalyst.

Also, a process of fluorinating sulfuryl chloride with antimony fluoride in the presence of a catalyst or process of thermally decomposing barium fluorosulfonate has been known, but these processes are complicated in operation.

Further, a process of electrolyzing fluorosulfonic acid or a process of liquefying sulfur dioxide by cooling and thereafter electrolyzing a liquid mixture of high concentration of sulfur dioxide and hydrogen fluoride has been known, but the former process is defective in that the operation is complicated and, moreover, the yield of the product is poor, and the latter process is difficult to industrialize because the sulfur dioxide need be liquefied by cooling.

SUMMARY OF THE INVENTION

A primary object of this invention is to provide a process of producing sulfuryl fluoride from a gaseous sulfur dioxide continuously and easily in one step.

As mentioned above, this invention relates to a process of producing sulfuryl fluoride by blowing a gaseous sulfur dioxide in fine foam condition into an electric current-applied anhydrous hydrogen fluoride thereby electrochemically fluorinating said gaseous sulfur dioxide.

According to the process of this invention, it is possible, by adjusting the amount of the gaseous sulfur dioxide to be fed or diluting the gaseous sulfur dioxide to be fed with an inert gas, to control the composition of reaction products or to almost avoid the cleavage of the sulfur-oxygen bond.

Further, according to the process of this invention, because the sulfur dioxide to be fed as raw material and the product, sulfuryl fluoride, are both gases, it is very easy to carry out continuous operation.

The other characteristic features of this invention will be readily understood from the detailed explanation given hereinafter and the accompanying drawing.

BRIEF DESCRIPTION OF THE DRAWING

The drawing is a systematic view showing one apparatus for carrying out the process of this invention.

DESCRIPTION OF THE PREFERRED EMBODIMENT

A preferred embodiment of this invention will be set forth in detail hereunder.

Referring to the drawing, 1 is an electrolytic cell provided inside with an anode consisting of a nickel plate, a cathode and a coiled pipe 2 for temperature adjustment. 3 is a reflux condenser positioned above said electrolytic cell and connected thereto by a pipe 4 so that the gas generated out of said electrolytic cell is guided to said reflux condenser.

The other end of the reflux condenser 3 is connected to a sodium fluoride-containing pipe 5, a vessel 6 containing a 5% aqueous solution of sodium sulfite (said solution containing 0.5% of potassium iodide) and a trap 7 cooled with liquid nitrogen, all being connected in series.

At the lower part of the electrolytic cell, there is provided a pipe 8, the open end of which forms a bubbler and is capped with a porous material 9 made of fluoro-plastics, for example, cloth made of polytetrafluoroethylene fiber, or porous plate, said pipe 8 being connected to a raw material gas-feeding pipe 10 through a valve 11.

An anhydrous hydrogen fluoride is first charged into the electrolytic cell 1 and pre-electrolyzed to remove the impurities. Then, while applying an electric current, the raw material gas through the bubbler in fine foam condition into the anhydrous hydrogen fluoride maintained at a temperature above the boiling point of the raw material gas at a rate of 0.001–0.01 mol/min. to 1 l. of the anhydrous hydrogen fluoride. The raw material gas may be a sulfur dioxide alone, but, to carry out the fluorination reaction smoothly, it is preferable to use the sulfur dioxide in admixture with an inert gas, for example, helium, nitrogen or the like. The temperature of the anhydrous hydrogen fluoride in the electrolytic cell is usually within the range of 5–19° C., preferably 15–17° C. Also, the anodic current density of the electrolytic cell is usually within the range of 1.0–5.0 a./dm.$^2$ and the voltage is within the range of 4.5–9 v., when the feed rate of sulfur dioxide gas is increased, sulfur dioxide comes out in unreacted condition from the electrolytic cell, so, in such cases, the anodic current density, too, is to be increased.

There is no need to add a conductivity additive to the anhydrous hydrogen fluoride in the electrolytic cell for operation, but, even if a conductivity additive, for example, alkali metal fluoride, is added, the process of this invention can, of course, be carried out.

The gas generated out of the electrolytic cell is passed through the reflux condenser 3 to separate the anhydrous hydrogen fluoride which still remains in the gas is absorbed and removed by the sodium fluoride pipe 5. The gas is further passed through the vessel 6 containing an aqueous solution of sodium sulfite to remove the secondary products such as oxygen difluoride, thionyl tetrafluoride, etc., contained in the gas, and finally guided to and collected by the trap 7 cooled with liquid nitrogen.

The product collected is a mixture of sulfuryl fluoride and a trace amount of sulfur hexafluoride. This mixture is further rectified by a precise low-temperature fractional distillation column to obtain sulfuryl fluoride of high purity.

Incidentally, as the method for purification of the gas generated out of the electrolytic cell, a method of purification using sodium fluoride and an aqueous solution of sodium sulfite has been explained herein, but it is needless to say that other known methods of purification can be utilized.

This invention will be further illustrated by the following examples, but these examples are for mere illustration purposes and in no way limit this invention.

EXAMPLE 1

The electrolytic cell used in this example was made of Monel metal and had a capacity of 1 l. Inside of said cell, eight anodes and nine cathodes were arranged, the effective area of said electrodes being 9.2 dm.$^2$.

At the lower part of the electrolytic cell, there was provided a bubbler consisting of a pipe having an inner diameter of 5 mm. and the open end of which was capped with a filter paper made of polytetrafluoroethylene fiber.

The electrolytic cell was charged with 1 l. of anhydrous hydrogen fluoride (6° C.) which was then purified by pre-electrolysis, and, thereafter, a gaseous sulfur dioxide in fine foam condition was blown into said anhydrous hydrogen fluoride at a rate of 0.00153 mol/min. The anodic current density was 2.8 a./dm.$^2$ and the cell voltage was 6–7 v. The gas generated out of the electrolytic cell was purified by means of a sodium fluoride pipe and an aqueous solution of sodium sulfite, and thereafter collected by a trap cooled with liquid nitrogen.

The reaction time was 150 minutes. The product collected by the trap was rectified by a precise low-temperature fractional distillation column to obtain 15.9 g. of sulfuryl fluoride. The yield was 67.8% and the purity was more than 99.8%.

EXAMPLE 2

Under the same conditions as in Example 1, a gaseous sulfur dioxide was blown into the anhydrous hydrogen fluoride at a rate of 0.00172 mol/min. together with helium at a rate of 15 cc./min.

The reaction time was 150 minutes. The product collected by the trap was rectified to obtain 19.3 g. of sulfuryl fluoride. The yield was 73.3% and the purity was more than 99.8%.

EXAMPLE 3

Under the same conditions as in Example 1, with the exception that, the temperature of the anhydrous hydrogen fluoride was set at 16° C., a gaseous sulfur dioxide was blown in at a rate of 0.00159 mol/min. together with helium at a rate of 15 cc./min.

The reaction time was 150 minutes. The product collected by the trap was rectified to obtain 22.0 g. of sulfuryl fluoride. The yield was 90.4% and the purity was more than 99.8%.

What we claimed is:

1. A process for the production of sulfuryl fluoride characterized by blowing the raw material gas containing a gaseous sulfur dioxide in fine foam condition into an electric current-applied anhydrous hydrogen fluoride.

2. A process according to claim 1, wherein the temperature of the anhydrous hydrogen fluoride is above the boiling point of the raw material gas.

References Cited
UNITED STATES PATENTS 2,717,235   9/1955   Prober _____ 204—59

HOWARD S. WILLIAMS, Primary Examiner